April 23, 1940.         J. L. ANDERSON         2,197,962
APPARATUS FOR MAKING WELDED PIPES AND TUBES
Original Filed Aug. 6, 1936     2 Sheets-Sheet 1
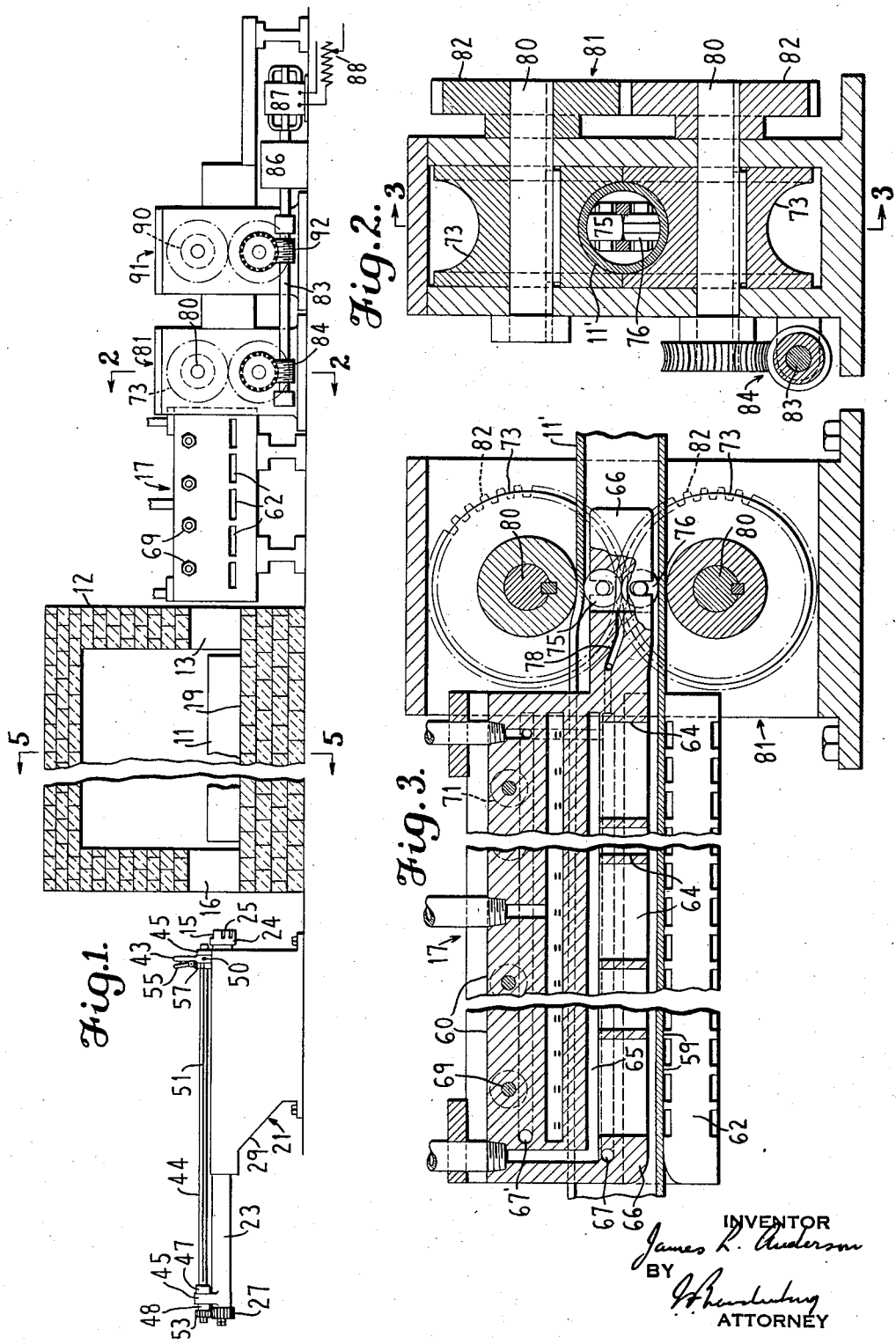
INVENTOR
James L. Anderson
BY
ATTORNEY April 23, 1940.  J. L. ANDERSON  2,197,962
APPARATUS FOR MAKING WELDED PIPES AND TUBES
Original Filed Aug. 6, 1936  2 Sheets-Sheet 2
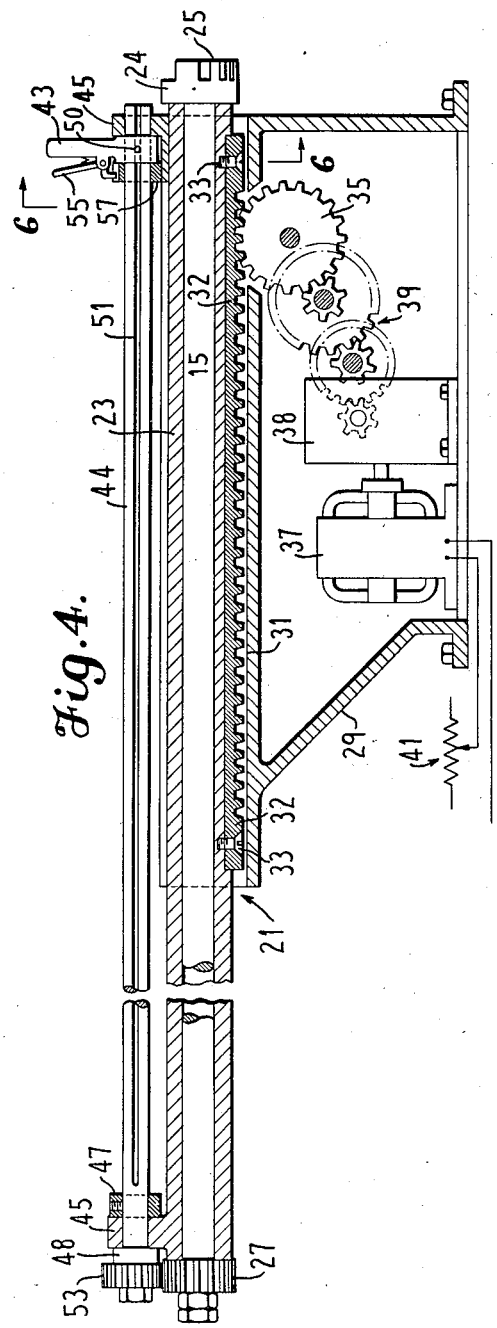
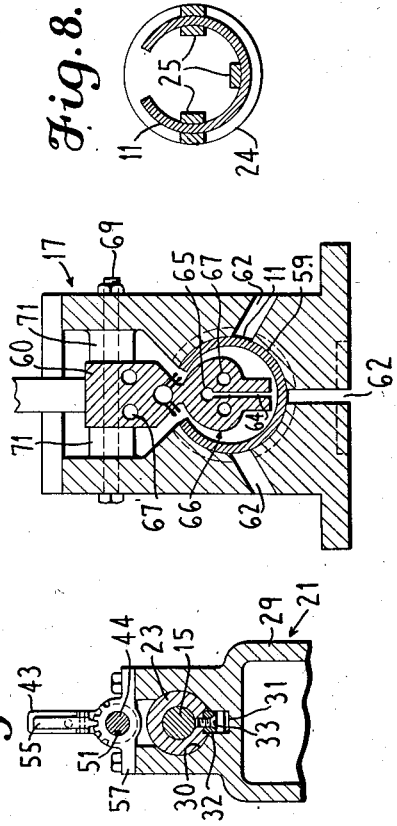
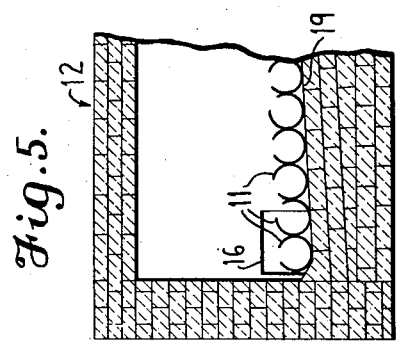

Patented Apr. 23, 1940

2,197,962

UNITED STATES PATENT OFFICE 2,197,962

APPARATUS FOR MAKING WELDED PIPES AND TUBES

James L. Anderson, Closter, N. J., assignor to Air Reduction Company, Incorporated, New York, N. Y., a corporation of New York Original application August 6, 1936, Serial No. 94,549. Divided and this application January 18, 1937, Serial No. 121,042

8 Claims. (Cl. 78—83)

This invention relates to apparatus for making welded pipe and tubing.

In the design of equipment for making welded pipe and tubing by pulling skelp past high-intensity heating devices which raise the traveling edges of the skelp to a welding condition before they are brought together, it has been necessary to make provision for the passage through the equipment of tongs or other pulling apparatus used to draw the skelp.

In my copending application Serial No. 94,549, filed August 6, 1936, of which this case is a division, there is disclosed an improved method of making welded pipe and tubing with such edge heating, but without the use of tongs.

It is an object of this invention to provide apparatus for making welded pipe and tubing in accordance with the method described in that application. It is an object of the invention to move the edges to be welded past intense heating means at a predetermined speed and without the use of tongs or other pulling devices.

One of the advantages of the invention is that the heating and the forming and welding equipment is of simpler and more efficient design because no concessions have to be made for the passage of tongs.

In accordance with one feature of the invention partially-formed skelp is preheated in a furnace and then pushed through a heating retort and into the welding apparatus instead of being pulled, as in the prior art. The apparatus can, therefore, include a mandrel and rollers inside of the partially-formed skelp or tube where it passes through the retort and welding apparatus.

In the preferred embodiment of the invention the heating is done with flame jets, but in its broader aspects the invention is not limited to the manufacture of pipe and tubing with retorts having flame jets. Some features of the invention are applicable to any pipe or tube manufacture in which separate lengths of skelp must be introduced into heating or forming and welding apparatus.

Other objects, features and advantages of the invention will appear or be pointed out as the specification proceeds.

In the accompanying drawings, forming part hereof:

Fig. 1 is a side elevation, with the furnace in section, showing apparatus for making tubes in accordance with this invention;

Fig. 2 is an enlarged sectional view taken along the line 2—2 of Fig. 1;

Fig. 3 is a sectional view on the line 3—3 of Fig. 2 and showing a longitudinal section of the retort;

Fig. 4 is an enlarged longitudinal sectional view of the plunger mechanism shown at one side of the furnace in Fig. 1;

Fig. 5 is an enlarged sectional view through the furnace, the section being taken along the line 5—5 of Fig. 1;

Fig. 6 is a sectional view on the line 6—6 of Fig. 4;

Fig. 7 is an enlarged transverse sectional view through the edge-heating retort with the partially-formed skelp traveling through the retort; and Fig. 8 is a detail view illustrating how the jaws on the forward end of the plunger hold the pipe.

Partially-formed tubes or skelps 11 are heated in a furnace 12. After being heated to the desired temperature, each partially-formed skelp 11 is pushed out of the furnace through an exit opening 13. The partially-formed skelp is pushed by a plunger 15 which enters the furnace through an opening 16 in the furnace wall opposite the exit opening 13. An edge-heating retort 17 is located just beyond the exit opening 13.

The furnace 12 contains a number of partially-formed skelps 11 at the same time, and they rest on a sloping floor 19 which is lowest at the end between the openings 13 and 16. The partially-formed skelps 11 are put into the furnace at the high end of the floor 19, and they lie side by side, as shown in Fig. 5. The pitch of the furnace floor is sufficient to cause the partially-formed skelps 11 to slide or roll toward the low end of the floor every time the lowest skelp is ejected from the furnace.

Another advantage of having the skelp partially formed before heating it is that the bent skelp has much greater stiffness than flat skelp and will not buckle when pushed from one end to eject it from the furnace.

An ejector unit 21, which includes the plunger 15 and its operating mechanism, is shown in detail in Fig. 4. The plunger 15 is supported in a sleeve 23 and is rotatable in the sleeve as a bearing. A face plate 24 is secured to the forward end of the plunger 15 and has jaws 25 adapted to receive the rearward end of the partially-formed skelp 11, as shown in Fig. 8. The plunger 15 is rotated, by means which will be described, to bring the jaws 25 into the position, with respect to the partially-formed tube 11, shown in Fig. 8. If the open portion of the partially-formed skelp is toward the bottom, for example, the plunger will be rotated to turn the face plate 24 through a half revolution so that the middle one of the jaws 25 is opposite the open portion of the partially-formed skelp.

After the end of the partially-formed skelp 11 is held by the jaws 25 the plunger is rotated to bring the middle jaw 25 to the bottom so that each skelp ejected from the furnace has its longitudinal edges in the same uppermost positions when it enters the retort 17.

Referring again to Fig. 4, the plunger 15 has a gear 27 at the end remote from the face plate 24, and this gear and the face plate serve as thrust bearings to prevent endwise movement of the plunger 15 in the sleeve 23 and to compel the plunger to move as a unit with the sleeve when the latter is moved axially.

The sleeve 23 is supported by a frame 29, and is movable axially on a bearing 30 (Fig. 6) on the frame. The bearing 30 has a bottom groove 31. A rack 32 is fastened to the sleeve 23 by screws 33 and slides freely in the groove 31. The rack serves as a spline to prevent rotation of the sleeve 23. A gear 35 (Fig. 4) meshes with the rack 32, and rotation of the gear 35 in one direction or the other causes the plunger 15 to move forward or backward.

The gear 35 is driven from an electric motor 37 through worm reduction gearing 38 and a reducing gear train 39. The motor 37 and gearing 38, 39 are shown enclosed in the frame 29. The motor 37 is equipped with an adjustable speed control device 41. The speed is regulated to obtain the most advantageous rate of travel of the plunger 15 on its stroke into the furnace. That rate determines the speed with which each partially-formed skelp 11 is pushed into and through the edge-heating retort 17, and the speed must be determined in accordance with the degree of furnace heating, the thickness of the skelp, the intensity of the heating agencies in the retort, and the type of weld desired. The greater the amount of heat to be added in the retort 17, the slower the motor speed.

The plunger 15 is rotated by a handle 43 to initially bring the face plate 24 and jaws 25 into correct relation with the end of the partially-formed skelp 11 and rotate the skelp into a position with the edges uppermost. The handle 43 is on a shaft 44 which rotates in bearings in lugs 45 at the top of the frame 29. Collars 47, 48 on the shaft 44 prevent the shaft from moving axially, but the shaft can rotate in its bearings unless prevented from doing so by the handle 43. The handle has a pin 50 extending into a groove 51 in the shaft 44 and comprising a slidable connection between the handle 43 and the shaft 44. A gear 53 fastened to the end of the shaft 44 meshes with the gear 27 and transmits rotary movement of the shaft 44 to the plunger 15.

The handle 43 is held in position by a bell-crank 55 pivotally connected to the handle and having a latch at one end which fits into the recesses between the teeth of a gear segment 57 attached to the frame 29.

The heating retort 17 is best shown in Figs. 3 and 7. The partially-formed skelp 11 passes across grooved guide surfaces 59. A torch or block 60 has orifices in position to cause streams or jets of air, oxygen, or burning fuel gas or combinations thereof to be applied directly to the edge faces of the partially-formed skelp as it passes through the retort. The heating is preferably by oxyacetylene flames directed against the edge faces. With such flame heating in the retort it is not necessary to raise the metal to such a high temperature in the furnace, the apparatus can be operated at higher speed, and the reducing envelope gases produced by the primary combustion purify the metal of the edge faces which later becomes the metal of the weld.

The grooves in the guide surfaces 59 have exhaust ports 62 for the escape of the gas which travels across the outside surface of the partially-formed skelp. When using oxyacetylene flame jets in the retort, the products of the primary combustion burn as they travel around the outside surface of the partially-formed skelp to reach the exhaust ports 62, and heat the metal back from the edge faces and reduce conduction losses from the edges.

Gas from the jets also passes into the interior of the partially-formed tube, and this gas escapes through ports 64 which open into an exhaust conduit 65 in a mandrel 66 formed integral with the block 60. The mandrel 66 is cooled by water or other cooling medium flowing in cooling passages 67. Similar passages 67' for cooling liquid are provided in the block 60.

The block 60 is secured in the retort 17 by bolts 69. Bosses or spacers 71 hold the block in a central position and leave openings on both sides of the block for air to reach the jets when burning gaseous fuel is used to heat the skelp edges.

The mandrel 66 extends beyond the rearward end of the block 60 and into the pass between welding rolls 73. The retort guides the skelp into the pass between the rolls 73, and these rolls have semi-circular grooved faces for completing the forming of the skelp and for bringing the heated edge faces together to make a weld. The welded tube is designated by the reference character 11' in Figs. 2 and 3. The weld is rolled between the upper welding roll 73 and a roller 75 which is held against displacement lengthwise of the tube by the mandrel 66. The roller 75 is supported by a roller 76 running on the bottom of the tube. The rollers 75 and 76 are cooled by a small stream of water flowing through a conduit 78 from the cooling chamber 67.

The welding rolls 73 are keyed to axles 80, which turn in bearings in a roll stand 81. The axles 80 are connected by gears 82, and one of the axles is driven by a shaft 83 through worm gearing 84. The shaft 83 is driven through a reduction gear box 86 (Fig. 1) by a motor 87. The motor 87 has a rheostat 88 or other means for controlling the speed of the welding rolls.

When each partially-formed skelp 11 is longer than the retort 17 one end of the skelp comes into the bite of the rolls 73 before the other end enters the retort. For shorter skelps the mandrel 66 must be shorter so that the plunger 15 can enter the retort far enough to push the end of the tube blank into the bite of the rolls 73. The speed of the skelp through the retort is first determined by the rate at which the plunger 15 advances, but later by the speed rotation of the rolls 73.

The speed with which the skelp moves through the retort must be controlled in accordance with the rate at which the retort heats the edge faces, and the temperature of the skelp when it is removed from the furnace. The rate of heating in the retort depends upon the kind of gases used and the amount. Oxyacetylene flames give an intense heat, and with such flames closely spaced throughout the length of the retort the skelp can travel at high speed.

The welded tube may travel through one or more sizing passes after leaving the welding rolls 73. Fig. 1 shows a single sizing pass comprising rolls 90 in a stand 91. The sizing rolls are driven from the shaft 83 through worm gearing 92 in the same manner as the welding rolls are driven from the shaft 83.

Other means for driving the rolls may be employed, and various other changes can be made in the illustrated embodiment of the invention.

I claim:

1. In a retort for heating the edges of partially-formed tube, guide surfaces across which a partially-formed tube moves as it travels through the retort with continuous motion, a block located in the retort and having orifices from which streams of gas are directed against the edge faces of the partially-formed tube, and a mandrel connected to said block and extending downward into the tube and forward beyond the end of the retort.

2. In a retort for heating the edges of a partially-formed tube, guide surfaces across which the partially-formed tube moves as it travels through the retort with continuous motion, a block located in the retort and having orifices from which streams of gas are directed against the edge faces of the partially-formed tube, a portion on said block extending downward into the partially-formed tube, an exhaust conduit extending through the lower portion of the block and having a discharge opening outside of the retort, and ports in the lower portion of the block for the escape of gas from the inside of the partially-formed tube into said exhaust conduit.

3. In tube welding apparatus having a torch constructed and arranged to heat the edge faces of a partially-formed tube, a welding roll stand located just beyond the torch and including two rolls which cooperate to complete the forming of the tube and bring the edge faces together to make the weld, and two contacting rollers within the tube immediately beyond the point at which the weld is made, one of said rollers running on the bottom inside surface of the tube and the other of said rollers bearing against the inside of the tube along the line of the weld and cooperating with one of the welding rolls to roll the metal of the freshly made weld, the improvement of an extension on the torch projecting between the edge faces and into the partially-formed tube, a mandrel connected with said extension on the torch and reaching into the pass between the welding rolls, and bearings on the mandrel for holding the rollers against displacement lengthwise of the tube.

4. Tube welding apparatus wherein mechanism pushes the partially-formed tubes from a supporting means into welding means, characterized by the fact that said mechanism comprises a frame, a sleeve, bearings supporting the sleeve on the frame for reciprocating movement toward and from the welding means, a rack connected to the sleeve and serving as a key to prevent rotation of the sleeve, a rod extending through the sleeve and rotatable in the sleeve, a plate connected to one end of the rod just beyond the sleeve, jaws extending from the front of said plate for gripping the end of a tube, a gear secured to the end of the rod remote from the plate, said gear and plate serving as thrust collars to prevent any substantial axial movement of the rod in the sleeve, another gear meshing with the gear on said rod, a shaft connected to the other gear and supported for reciprocating movement with the sleeve and rod so that the gears remain in mesh for all positions of the sleeve and rod, a handle supported by the frame for rotation about a substantially fixed axis, a sliding connection through which said handle rotates the shaft when said shaft is in any position, and gear means including a pinion meshing with the rack on the sleeve to impart movement to the sleeve and its connected parts.

5. Tube welding apparatus comprising a welding roll stand having rolls which complete the forming of a tube blank and bring the edges of the seam into contact, a heating torch located ahead of said roll stand in position to heat the seam edges before they come into contact, a mandrel integral with said torch and extending within the tube blank as far as the welding roll stand, and a weld-smoothing tool carried by the mandrel in constant contact with the inside wall of the tube at the region where the rolls of said welding roll stand contact with the outside wall of the tube.

6. Welding apparatus including a retort for heating the edges of partially-formed tube, guide surfaces across which a partially formed tube moves as it travels through the retort with continuous motion, a block located in the retort and having orifices from which stream of gas are directed against the edge faces of the partially-formed tube, a mandrel connected to said block and extending downward into the tube and forward beyond the end of the retort, and mechanism for introducing successive lengths of partially-formed tube into the retort without removing the mandrel, said mechanism including a plunger, jaws at one end of the plunger for holding the rearward end of a length of partially-formed tube, a support for the tube in line with the retort, and means including an adjustable speed control for moving the plunger to push the tube across the support and into the retort at a speed correlated with the heating effect of the retort.

7. Tube welding apparatus comprising a retort with means for projecting heating jets directly against the edge faces of the seam of a partially-formed tube, a welding roll stand located at one end of the retort and including two rolls constructed and arranged to bring into contact the seam edges of the partially-formed tube, power means for driving the welding rolls, apparatus for controlling the speed of said power means to correlate the welding roll speed with the rate of edge heating of said heating jets, supporting means at the other end of the retort, and mechanism for pushing successive lengths of partially-formed tubing from the supporting means through the retort and into the bite of the welding rolls, said mechanism including means for correlating the rate at which the partially-formed tube is pushed and the rate at which the seam edges are heated so that the edge faces of the seam are heated to a welding condition by the time the forward portion of the partially-formed tube reaches the welding rolls.

8. Tube welding apparatus comprising an edge-heating device including means for projecting heating jets directly against the edge faces of the seam of a partially-formed tube, a welding roll stand located at one end of the edge-heating device and including two rolls constructed and arranged to bring into contact the seam edges of the partially-formed tube, power means for driving the welding rolls, apparatus for controlling the speed of said power means to correlate the welding roll speed with the rate of edge heating of said heating jets, a furnace at the other end of the edge-heating device for heating the entire body of the partially-formed tube, and mechanism on the side of the furnace remote from said edge-heating device for pushing successive lengths of partially-formed tubing from the furnace through the retort and into the bite of the welding rolls, said mechanism including means for correlating the rate at which the partially-formed tube is pushed and the rate at which the seam edges are heated so that the edge faces of the seam are heated to a welding condition by the time the forward portion of the partially-formed tube reaches the welding rolls.

JAMES L. ANDERSON.